Nov. 18, 1941. W. F. BROWN ET AL 2,262,988
APPARATUS FOR CUTTING SHEET GLASS
Filed Oct. 4, 1937 3 Sheets-Sheet 1

Inventors
WILBUR F. BROWN.
JOHN L. DRAKE.

By Frank Fraser
Attorney

Nov. 18, 1941.      W. F. BROWN ET AL      2,262,988
APPARATUS FOR CUTTING SHEET GLASS
Filed Oct. 4, 1937      3 Sheets-Sheet 2

Inventors
WILBUR F. BROWN.
JOHN L. DRAKE.
By Frank Fraser
Attorney

Nov. 18, 1941.   W. F. BROWN ET AL   2,262,988
APPARATUS FOR CUTTING SHEET GLASS
Filed Oct. 4, 1937   3 Sheets-Sheet 3

Inventors
WILBUR F. BROWN.
JOHN L. DRAKE.
By Frank Fraser
Attorney

Patented Nov. 18, 1941

2,262,988

UNITED STATES PATENT OFFICE 2,262,988

APPARATUS FOR CUTTING SHEET GLASS

Wilbur F. Brown and John L. Drake, Toledo, Ohio, assignors to Libbey-Owens-Ford Glass Company, Toledo, Ohio, a corporation of Ohio Application October 4, 1937, Serial No. 167,200

4 Claims. (Cl. 49—14)

The present invention relates broadly to the cutting of sheet glass and has for its primary object the provision of improved apparatus for cutting sheet glass while in a hot plastic condition to form relatively small tiles of predetermined uniform dimensions.

Another object of the invention is the provision of cutting apparatus of the above character for die-cutting or stamping the tiles preferably from a continuously moving ribbon of plastic glass rapidly, efficiently, and economically.

Other objects and advantages of the invention will become more apparent during the course of the following description when taken in connection with the accompanying drawings.

In the drawings wherein like numerals are employed to designate like parts throughout the same:

Figure 1:
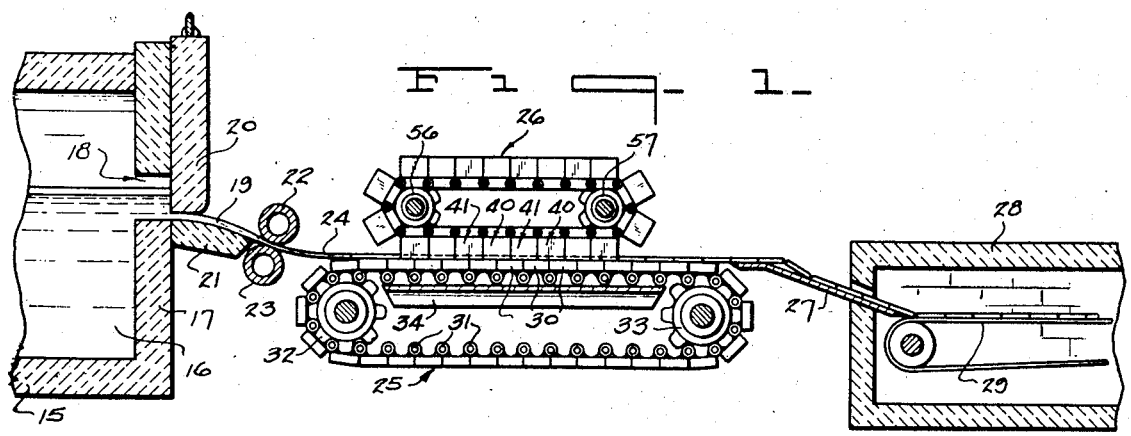
Fig. 1 is a vertical longitudinal sectional view through one form of apparatus constructed in accordance with the invention.
Figures 2, 3:
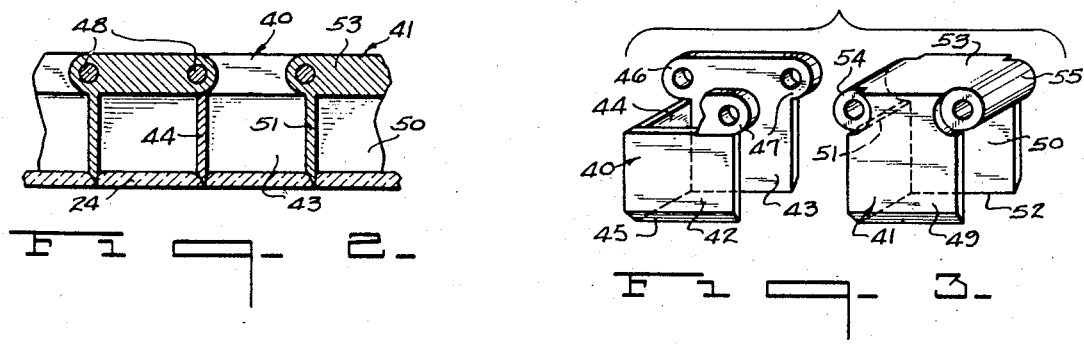
Fig. 2 is a detail vertical sectional view through a portion of the cutting mechanism.
Fig. 3 is a perspective view of two complemental cutting elements.

With reference to that form of the invention illustrated in Figs. 1, 2 and 3, the numeral 15 designates the outlet end of a continuous tank furnace in which is produced a mass of molten glass 16. The exit end wall 17 of the furnace is provided with a horizontal slot 18 through which the molten glass is adapted to flow in the form of a relatively heavy stream 19, the thickness of which may be controlled by a vertically adjustable gate 20. The stream of molten glass 19 flows from the furnace over a slab 21 to and between a pair of rotatable forming rolls 22 and 23 which function to reduce the stream of glass to a sheet or ribbon 24 of predetermined uniform thickness. The glass ribbon, upon leaving the forming rolls 22 and 23, is received and carried forwardly upon a horizontal endless conveyor table 25 and during its travel over said table, the ribbon of glass is adapted to be cut into relatively small tiles by the cutting mechanism mounted above the conveyor table 25 and designated in its entirety by the numeral 26. After being cut, the glass ribbon 24 passes from the table 25 over an inclined chute 27 into an annealing leer 28 through which it may be carried upon an endless conveyor 29 or in any other desired manner.

The conveyor table 25 may be of any preferred construction but as here shown consists of a plurality of supporting elements or blocks 30 pivotally connected together as at 31 in endless belt formation. The endless table is trained at the opposite ends of its loop about sprockets 32 and 33, with the upper horizontal run thereof being supported upon horizontal rails 34. The supporting elements or blocks 30 are of such construction and so arranged that the upper horizontal run of the table will provide a continuous, flat and unbroken surface for supporting the ribbon of glass 24 as it passes thereover. One of the sprockets 32 or 33 may be positively driven to drive the endless conveyor table in a direction to advance the glass ribbon forwardly.

Figure 4:
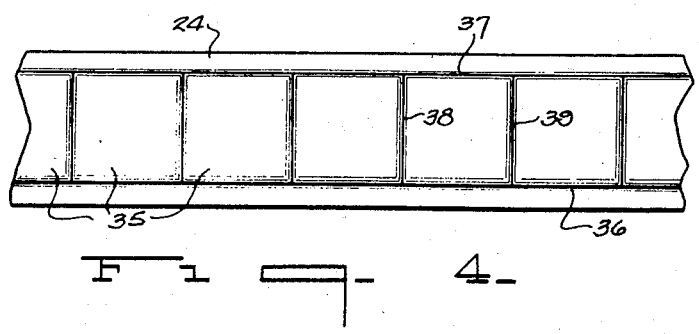
Fig. 4 is a plan view of the continuous ribbon of glass after it has been cut.
Figure 5:
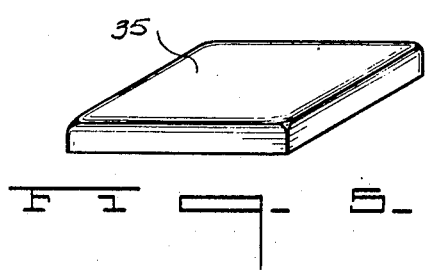
Fig. 5 is a perspective view of one of the glass tiles.

As the ribbon of glass is carried forwardly by the endless conveyor table, the cutting mechanism 26 is adapted to automatically die-cut or stamp therefrom a series of successive tiles 35 of predetermined dimensions as shown in Fig. 4. This is accomplished by cutting the glass ribbon both longitudinally and transversely, said ribbon being cut longitudinally along the lines 36 and 37 to give a strip corresponding to the width of tile desired and also transversely along lines 38 and 39 to sever the strip into tiles 35 of the proper length. Although the tiles 35 are here shown as being square, they may of course be rectangular or of any other shape.

The cutting mechanism 26 for forming the tiles 35 comprises a plurality of pairs of complemental cutting elements 40 and 41 (Fig. 3) which are pivotally associated with one another in endless belt formation. More specifically, each cutting element 40 is of substantially channel shape comprising the opposite side walls 42 and 43 and a transverse rear wall 44, each of said walls being formed at its outer end with a cutting edge 45. The opposite or inner ends of the side walls 42 and 43 are each provided with the laterally projecting ears 46 and 47 having transverse openings therethrough for the reception of pivot pins 48 by means of which the cutting elements are pivotally connected together. Each cutting element 41 also comprises the opposite side walls 49 and 50 and transverse rear wall 51 which are formed at their outer ends with cutting edges 52. The opposite or inner ends of the side and rear walls 49, 50 and 51 of the cutting element are formed integral with a horizontal body portion 53 provided with the spaced transverse bearing portions 54 and 55 having openings therethrough also for the reception of the pivot pins 48.

In assembling the cutting elements 40 and 41, the cutting element 41 is associated with cutting element 40 by inserting the bearing portion 54 of element 41 between the ears 47 of element 40 and passing a pivot pin 48 through the aligned openings in said ears 47 and bearing portion 54. When this is done, the rear wall 51 of the cutting element 41 will also constitute the front wall of the cutting element 40, whereby to form a substantially square cutting die. A second cutting element 40 is then associated with the cutting element 41 by inserting the bearing portion 55 of element 41 between the ears 46 of the second element 40 and passing a pivot pin 48 through the aligned openings in the ears 46 and bearing portion 55. The rear wall 44 of the cutting element 40 then also becomes the front wall of the cutting element 41. The assembling of the cutting elements 40 and 41 in this manner is continued until an endless cutting mechanism of suitable length is provided as shown at 26 in Fig. 1, said endless cutting mechanism being trained at the opposite ends of its loop about sprockets 56 and 57, one of which is adapted to be positively driven in such a manner that the lower horizontal run of the cutting mechanism 26 will travel in the same direction as the ribbon of glass 24 and at the same speed.

In operation, as the continuous ribbon of glass 24 is carried forwardly upon the conveyor table 25, the endless cutting mechanism 26, moving therewith, is adapted to automatically die-cut or stamp from said ribbon a series of successive tiles 35, the side walls 42 and 43 of cutting elements 40 and side walls 49 and 50 of cutting elements 41 making the longitudinal cuts 36 and 37 in Fig. 4, while the rear walls 44 and 51 of the cutting elements 40 and 41 respectively will make the transverse cuts 38 and 39. The cutting mechanism functions to sever the hot plastic ribbon of glass by cutting substantially completely therethrough as shown in Fig. 2. The glass ribbon, after being cut, is passed over the chute 27 into and through the annealing leer 28 wherein the glass is adapted to be suitably annealed and cooled as well known in the art. The tiles 35 can then be readily broken out of the glass ribbon along the lines of cut and the edges thereof ground and/or polished as may be found desirable. With the cutting apparatus above described, tiles of uniform, predetermined dimensions can be rapidly, efficiently, and economically cut from a continuously moving ribbon of hot plastic glass.

Figure 6:
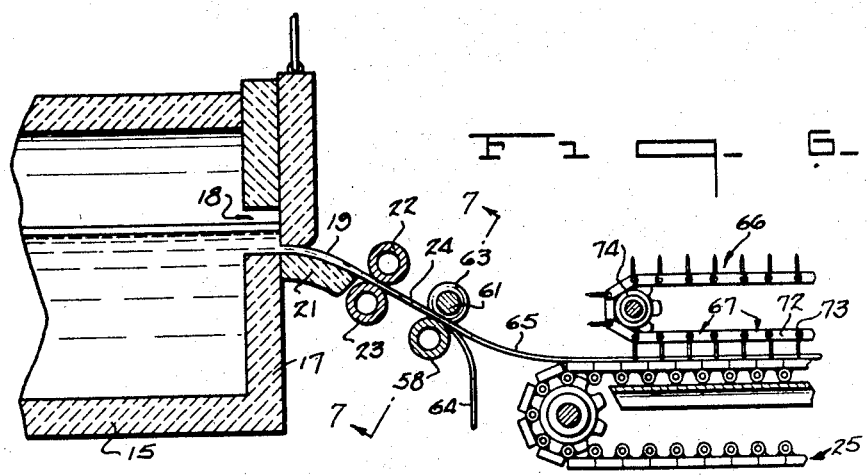
Fig. 6 is a view similar to Fig. 1 but showing another form of cutting apparatus.
Figures 7, 8:
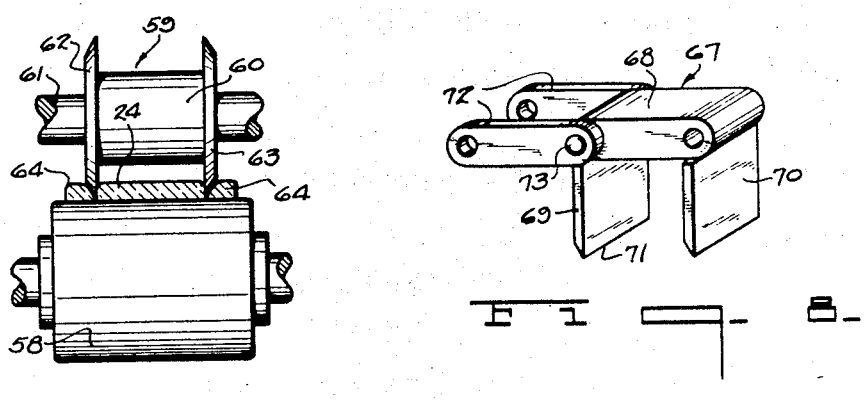
Fig. 7 is a sectional view taken substantially on line 7—7 of Fig. 6 showing the means for cutting the ribbon of glass to the desired width.
Fig. 8 is a perspective view of one of the cutting elements for cutting the glass ribbon transversely.

With reference now to that form of the invention illustrated in Figs. 6, 7 and 8, the stream of molten glass 19 also flows from the furnace 15 through a slot 18 in the end wall 17 thereof and passes downwardly over a slab 21 to the forming rolls 22 and 23 which act to reduce the stream of glass to a ribbon 24 of substantially predetermined uniform thickness, said ribbon being then received and carried forwardly upon the endless conveyor table 25. In this case, however, the glass ribbon 24 is first cut longitudinally to form a continuous strip having a width corresponding to the width of tile desired, after which said strip is cut transversely into tiles. To this end, the ribbon 24 is passed over a roller 58 located between the forming rolls 22 and 23 and conveyor table 25 and above which roller is mounted a cutting element 59 comprising a sleeve 60 fixed upon a shaft 61 and provided at its opposite ends with the cutting discs 62 and 63. As the ribbon of glass 24 passes over the roller 58, the cutting discs 62 and 63 serve to sever the ribbon longitudinally adjacent the edges thereof to form a strip 65 of the desired width, the cut-off marginal portions of the ribbon being deflected downwardly out of the path of travel of the strip 65 as indicated at 64.

The continuous strip of glass 65 then passes onto the endless conveyor table 25 and is adapted to be cut transversely while being carried forwardly upon said table by means of the endless cutting mechanism 66 mounted thereabove. The cutting mechanism 66 is made up of a plurality of cutting elements 67 pivotally associated with one another in endless belt formation. Each cutting element 67 comprises a body portion 68 provided with a pair of transverse cutting blades 69 and 70, each being formed at its outer end with a cutting edge 71. The cutting elements 67 are pivotally connected together by links 72 and pivot pins 73 which pass transversely through the overlapping portions of said cutting elements and links. A sufficient number of cutting elements are used to give an endless cutting mechanism 66 of the desired length and which may be trained at the opposite ends of its loop about sprockets 74. The width of the cutting blades 69 and 70 is equal to or slightly greater than the width of the glass strip 65 so that as the strip is being carried forwardly upon the conveyor table 25, the cutting mechanism 66 will serve to sever it transversely into a plurality of tiles.

Figure 9:
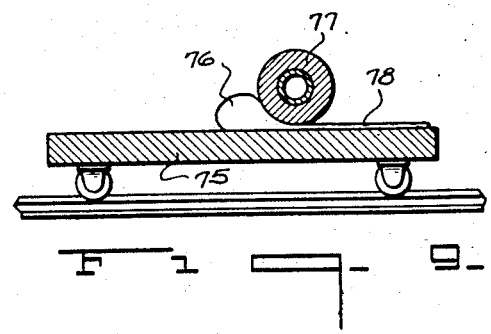
Fig. 9 is a sectional view of an apparatus for forming individual sheets of glass.
Figure 10:
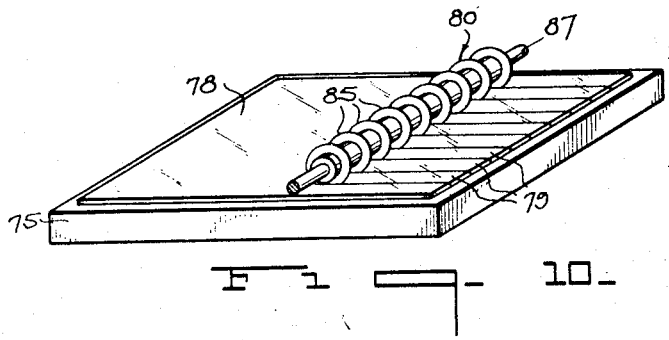
Fig. 10 is a perspective view illustrating the cutting of the sheet formed by the apparatus of Fig. 9.
Figure 11:
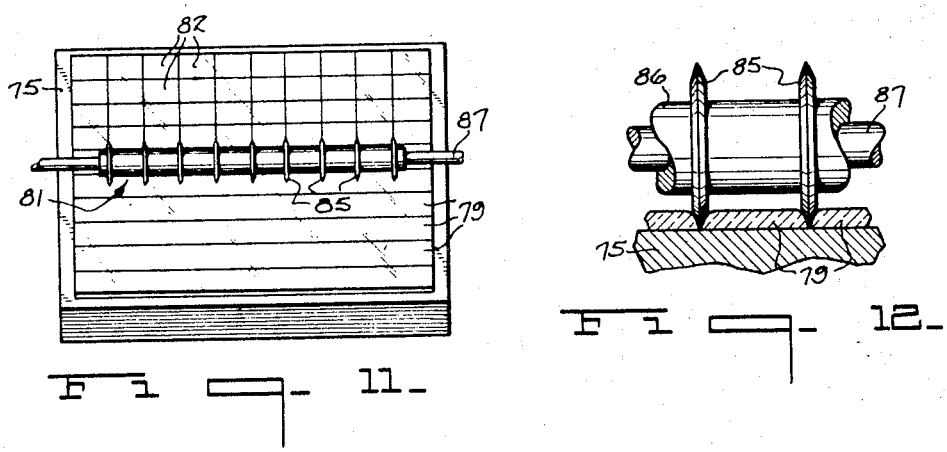
Fig. 11 is a plan view of the apparatus of Fig. 10.
Figure 12:
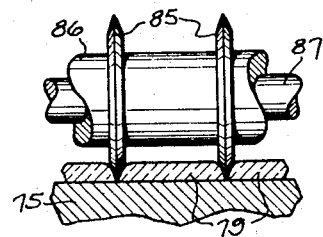
Fig. 12 is a detail view of a portion of the cutting means illustrated in Figs. 10 and 11.
Figure 13:
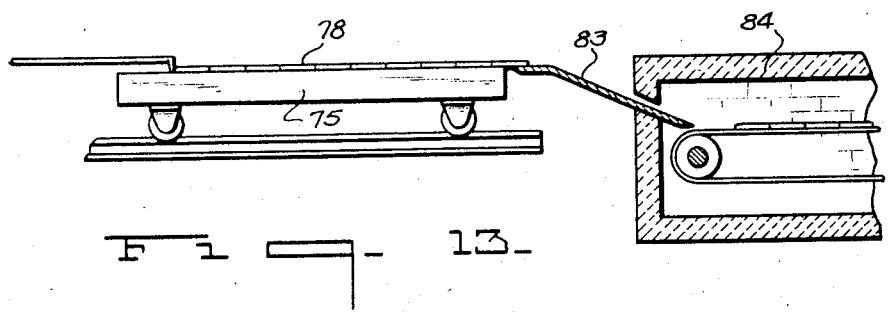
Fig. 13 is a view showing the transfer of the cut sheet into an annealing leer.

Although it is preferred that the tiles be cut from a continuous ribbon or strip of glass as described above, they can be formed from individual sheets of glass as illustrated in Figs. 9 to 13 if desired. Thus, there is shown in Fig. 9 a casting table 75 upon which a body of molten glass 76 is reduced by means of a roller 77 to a sheet 78 of predetermined uniform thickness. The glass sheet 78 can then be cut into tiles upon the casting table 75 or it may be transferred, while still hot and plastic, to a second table for cutting. As shown in Fig. 10, the glass sheet 78, while in a hot plastic state, is adapted to be first cut into a plurality of longitudinal strips 79 by the cutting apparatus 80, after which, as shown in Fig. 11, the strips 79 are adapted to be cut transversely by the cutting apparatus 81 to form tiles 82 of the proper dimensions. The glass sheet is then adapted to be transferred into the annealing leer 84 passing from the table 75 into said leer over an inclined chute 83. After the glass sheet has been annealed and cooled, the tiles 82 can be readily broken therefrom.

The cutting apparatus 80 and 81 comprises a plurality of spaced cutting discs 85 carried by a sleeve 86 mounted upon a shaft 87 which may be suitably supported and driven. The table 75 may be maintained stationary and the cutting apparatus moved thereover or the said cutting apparatus may be mounted in a fixed position and the table moved therebeneath. The manner in which the cutting discs 85 serve to sever the hot plastic glass sheet is clearly shown in Fig. 12.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim:

1. In apparatus for cutting sheet glass in a hot plastic condition both longitudinally and transversely to form tiles of predetermined dimensions, a plurality of rectangular cutting elements pivotally associated with one another in endless formation, each cutting element comprising opposite side walls and a transverse rear wall formed at their outer ends with cutting edges and the rear wall of one element positioned to form the front wall of the adjacent rearward element when a plurality of said elements are arranged in cutting position.

2. In apparatus for cutting sheet glass in a hot plastic condition both longitudinally and transversely to form tiles of predetermined dimensions, a plurality of cutting elements pivotally associated with one another in endless formation, each cutting element having transversely spaced longitudinal cutting edges and a single transverse cutting edge, whereby said transverse cutting edge cooperates with the longitudinal cutting edges of an adjacent cutting element and forms a common transverse cut between two adjacent tiles.

3. In apparatus for cutting sheet glass in a hot plastic condition both longitudinally and transversely to form tiles of predetermined dimensions, a plurality of cutting elements pivotally mounted in endless formation and each having transversely spaced longitudinal cutting edges and a single transverse cutting edge, said cutting elements being associated with one another in such a manner that the longitudinal cutting edges thereof cooperate to sever the sheet along continuous longitudinal lines while the transverse cutting edges sever the sheet along spaced transverse lines common to two adjacent tiles.

4. In apparatus for cutting sheet glass in a hot plastic condition both longitudinally and transversely to form substantially rectangular tiles of predetermined dimensions, a plurality of rectangular cutting elements pivotally associated with one another in endless formation, each cutting element having two transversely spaced cutting edges for cutting the glass ribbon longitudinally and a third transverse cutting edge for cutting the glass ribbon transversely, the third transverse cutting edge of one cutting element cooperating with the three cutting edges of an adjacent cutting element to cut out a substantially rectangular tile from the glass ribbon when said cutting elements are arranged in cutting position.

WILBUR F. BROWN.
JOHN L. DRAKE.